Patented Apr. 7, 1925.

1,532,646

UNITED STATES PATENT OFFICE.

CLAYTON W. BEDFORD, OF AKRON, OHIO, AND ROBERT L. SIBLEY, OF ELIZABETH, NEW JERSEY, ASSIGNORS TO THE GOODYEAR TIRE & RUBBER COMPANY, OF AKRON, OHIO, A CORPORATION OF OHIO.

THIOCARBANILIDE DERIVATIVE.

No Drawing. Original application filed August 12, 1918, Serial No. 249,580. Divided and application filed November 24, 1919. Serial No. 340,252. Again divided and this application filed October 2, 1922, Serial No. 591,946.

*To all whom it may concern:*

Be it known that we, CLAYTON W. BEDFORD, a citizen of the United States, and resident of Akron, Ohio, and ROBERT L. SIBLEY, a citizen of the United States, and resident of Elizabeth, New Jersey, have invented new and useful Improvements in Thiocarbanilide Derivatives, of which the following is a specification, this application being a division of application Serial No. 340,252, filed Nov. 24, 1919, Patent No. 1,477,803, granted Dec. 18, 1923, which is in turn a division of application Serial No. 249,580, filed Aug. 12, 1918, Patent No. 1,406,718, granted Feb. 14, 1922.

The present invention relates to the art of vulcanizing caoutchouc, and will be fully understood from the following specification.

It is well known that aniline serves as an accelerator for the curing of rubber by sulphur, and that the carbon bisulphide reaction product of aniline, i. e., thiocarbanilide, has greater curing power and possesses other advantages over the aniline itself, so that aniline as such has largely been replaced by its derivatives in this use.

Para-phenylene-diamine and para-amido-dimethyl-aniline as well as their carbon bisulphide reaction products are known as valuable accelerators. We have found, however, that the partial reduction of paranitroso-dimethyl-aniline by $H_2S$ produces a base that is not para-amido-dimethyl-aniline and which with carbon bisulphide produces a substituted thiourea which is very valuable as an accelerator.

The thiourea derivatives contemplated by the present invention may be prepared from paranitroso-dimethyl-aniline as follows:

One molecular weight of paranitroso-dimethyl-aniline is dissolved in water, or, if desired, in a suitable nonaqueous volatile solvent such as benzol, and hydrogen sulphide preferably equal to a molecular weight but less than two molecular weights is passed into and dissolved in the solution at any temperature up to the boiling point of the solvent. The hydrogen sulphide reacts with the paranitroso-dimethyl-aniline with the formation of a base very similar in composition to para-amido-dimethyl-aniline, this base being readily recoverable by the simple evaporation of the solvent and of any excess hydrogen sulphide.

As pointed out in our co-pending application Serial No. 249,579, filed August 12, 1918, this base itself constitutues a valuable accelerator. The present invention is particularly directed, however, to the production from this accelerator of a thiourea derivative having still more advantageous properties. This is accomplished by mixing the base in question with an excess of carbon bisulphide. The mixture immediately becomes hot, with the liberation of hydrogen sulphide, and the resulting product is a derivative of thiourea having very high curing power as an accelerator, and imparting a high modulus of elasticity and other desirable qualities to the cured rubber compound. In the use of the new accelerator for the curing of rubber it is added to the rubber sulphur mix in proper proportions, as, for example, from one-half to two per cent., and the vulcanization then accomplished in the usual manner.

For paranitroso-dimethyl-aniline, as given in the foregoing example, other paranitroso bodies, such, for example, as paranitrosophenol may be substituted, the amount of hydrogen sulphide and of carbon bisulphide required for reaction being of course, on a molecular basis.

While we have set forth in detail one specific manner of practicing our invention, this is to be regarded as illustrative only, and for the purpose of making the invention more clear. The invention is not to be regarded as limited to the exact procedure named, nor as dependent upon the accuracy of the chemical theories which we have advanced, except in so far as such limitations are included within the terms of the accompanying claims, in which it is our intention to claim all novelty inherent in our invention as broadly as is permissible in view of the prior art.

What we claim is:

1. The thiourea derivatives constituting the reaction product of carbon bisulphide with the base formed by the reaction of less than two mols of hydrogen sulphide with one mol of a paranitroso body.

2. The thiourea derivative constituting the reaction product of carbon bisulphide with the base formed by the reaction of one mol of hydrogen sulphide with one mol of a paranitroso body.

3. The thiourea derivative forming the reaction product of carbon bisulphide with the base resulting from the reaction of less than two mols of hydrogen sulphide on one mol of paranitroso-dimethyl-aniline.

4. The thiourea derivative forming the reaction product of carbon bisulphide on the base resulting from the reaction of one mol of hydrogen sulphide on one mol of paranitroso-dimethyl-aniline.

5. The method of producing a thiourea derivative which consists in causing less than two mols of hydrogen sulphide to combine with one mol of a paranitroso body and reacting upon the resultant base with carbon bisulphide.

6. The method of producing a thiourea derivative which consists in causing one mol of hydrogen sulphide to combine with one mol of a paranitroso body and reacting upon the resultant base with carbon bisulphide.

In witness whereof, we have hereunto signed our names in the presence of two subscribing witnesses.

CLAYTON W. BEDFORD.
ROBERT L. SIBLEY.

Witnesses for Bedford:
O. E. BEE,
F. A. LIND.

Witnesses for Sibley:
K. M. MAYHEW,
E. B. PECK.